US009380413B1

(12) United States Patent
Joshi

(10) Patent No.: US 9,380,413 B1
(45) Date of Patent: Jun. 28, 2016

(54) DYNAMICALLY FORMING THE CONTENT OF A MESSAGE TO A USER BASED ON A PERCEIVED EMOTION

(71) Applicant: INTUIT INC., Mountain View, CA (US)

(72) Inventor: Rekha M. Joshi, Karnataka (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 13/689,480

(22) Filed: Nov. 29, 2012

(51) Int. Cl.
*H04W 4/02* (2009.01)
*H04W 24/00* (2009.01)

(52) U.S. Cl.
CPC ........................................ *H04W 4/02* (2013.01)

(58) Field of Classification Search
CPC ................................ H04W 24/00; H04W 4/02
USPC ................. 455/456.1–456.3; 705/14.4–14.66
See application file for complete search history.

(56) References Cited

U.S. PATENT DOCUMENTS

| | | | |
|---|---|---|---|
| 8,249,932 B1* | 8/2012 | Cona et al. | 705/14.43 |
| 2007/0011740 A1* | 1/2007 | Davis et al. | 726/22 |
| 2009/0199107 A1* | 8/2009 | Lewis et al. | 715/745 |
| 2010/0042403 A1* | 2/2010 | Chandrasekar et al. | 704/9 |
| 2011/0087550 A1* | 4/2011 | Fordyce et al. | 705/14.65 |
| 2011/0225021 A1* | 9/2011 | Kantak et al. | 705/7.29 |
| 2012/0143693 A1* | 6/2012 | Chung et al. | 705/14.66 |
| 2012/0276928 A1* | 11/2012 | Shutter | 455/456.3 |
| 2013/0060632 A1* | 3/2013 | Gadhia et al. | 705/14.53 |
| 2013/0173380 A1* | 7/2013 | Akbari et al. | 705/14.43 |
| 2013/0347032 A1* | 12/2013 | Geraci | 725/34 |

* cited by examiner

*Primary Examiner* — Nathan Taylor
(74) *Attorney, Agent, or Firm* — Patterson & Sheridan, LLP

(57) ABSTRACT

One embodiment of the present invention provides a system for dynamically forming the content of a message to a user based on a perceived emotion state of the user. During operation, the system determines a geo-location of a user. Next, the system analyzes a news feed associated with the geo-location of the user to determine a perceived emotion state of the user. The system then forms a content for a message to the user based on the perceived emotional state of the user. Finally, the system delivers the message.

16 Claims, 3 Drawing Sheets

DYNAMICALLY FORMING THE CONTENT OF A MESSAGE TO A USER BASED ON A PERCEIVED EMOTION

BACKGROUND

Field of the Invention

The present invention relates to electronic messaging frameworks. More specifically, the present invention relates to a method and an apparatus for dynamically forming the content of a message to a user based on a perceived emotion state of the user.

SUMMARY

One embodiment of the present invention provides a system for dynamically forming the content of a message to a user based on a perceived emotion state of the user. During operation, the system determines a geo-location of a user. Next, the system analyzes a news feed associated with the geo-location of the user to determine a perceived emotion state of the user. The system then forms a content for a message to the user based on the perceived emotional state of the user. Finally, the system delivers the message.

In some embodiments of the present invention, the system determines the geo-location of the user by querying a service with an Internet Protocol (IP) address of the user.

In some embodiments of the present invention, the system determines the geo-location of the user by retrieving an address associated with the user from a profile associated with the user.

In some embodiments of the present invention, the system determines a granularity of the geo-location.

In some embodiments of the present invention, the system identifies a major event impacting the geo-location of the user.

In some embodiments of the present invention, the major event is at least one selected from the group consisting of: a natural disaster; a political event; a military event; a police action; and an economic event.

In some embodiments of the present invention, the system determines the perceived emotion state of the user by querying a service with the major event to determine emotional states associated with the major event.

In some embodiments of the present invention, the system determines a weather for the geo-location of the user.

In some embodiments of the present invention, the system determines the perceived emotion state of the user by querying a service with the weather to determine emotional states associated with the weather.

DETAILED DESCRIPTION

Figure 1:
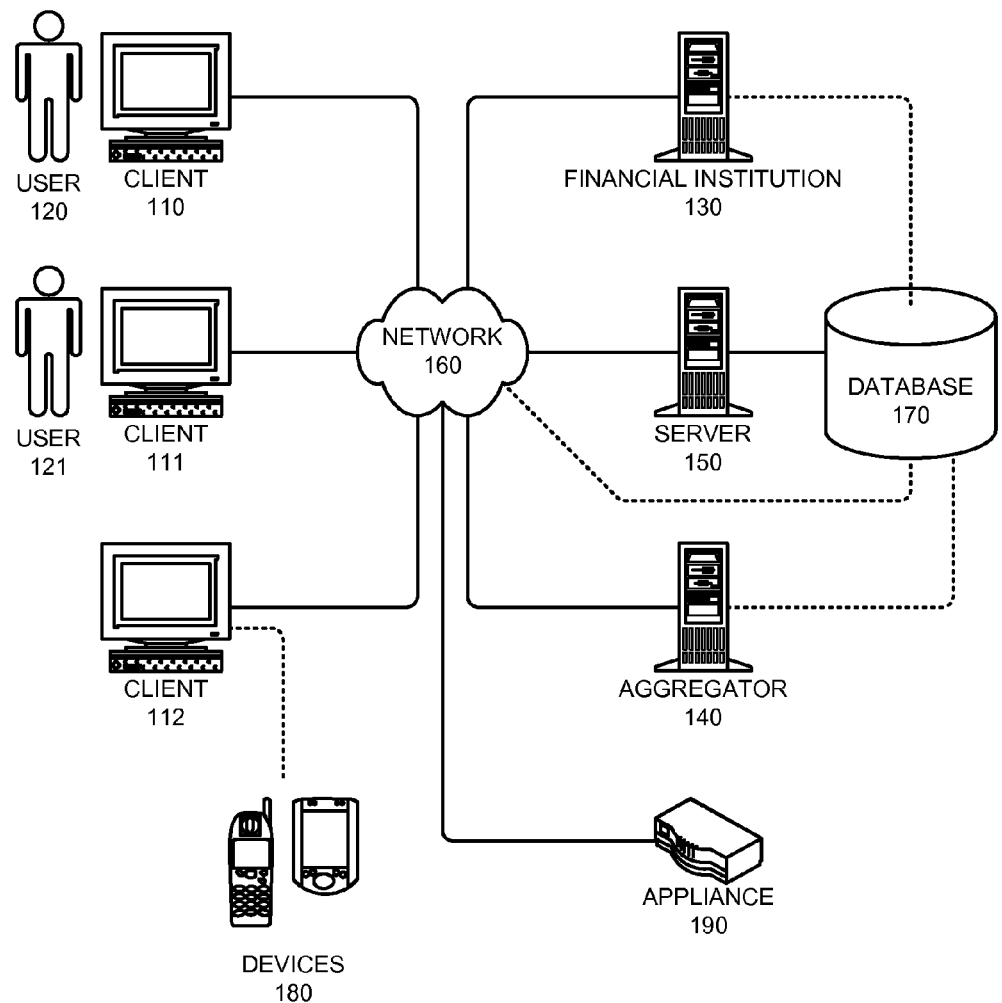
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for dynamically forming the content of a message to a user based on a perceived emotion state of the user. The system collects information from various sources, and tries to determine a likely emotional state of the user based on the collected information. Once a likely emotion state is determined, custom messages that play to the emotional state can be delivered to the user. For example, if the area in which the user lives has just experienced a major natural disaster, it may be beneficial to avoid sending messages to the user regarding vacation destinations and entertainment opportunities. Instead, it may be beneficial to send messages to the user regarding insurance opportunities, home repair, and emergency help links.

During operation, the system determines a geo-location of a user. Next, the system analyzes a news feed associated with the geo-location of the user to determine a perceived emotion state of the user. The system then forms a content for a message to the user based on the perceived emotional state of the user. Finally, the system delivers the message.

In some embodiments of the present invention, the system determines the geo-location of the user by querying a service with an Internet Protocol (IP) address of the user. Note that while the geo-location obtained from an IP address may be relatively close in proximity to the actual location of the user, IP address geo-location in many instances is a rough estimate of location, and may substantially differ from the actual location.

In some embodiments of the present invention, the system determines the geo-location of the user by retrieving an address associated with the user from a profile associated with the user. For example, the user may have created a user profile, including her address, when she registered for the service. In some embodiments, this profile address may be used to determine the user's location.

In some embodiments of the present invention, the system determines a granularity of the geo-location. For example, in some embodiments, it might be beneficial to determine the geo-location of a user at a state or county level, while in other embodiments, it might be beneficial to determine the geo-location of a user to a neighborhood or street level.

In some embodiments of the present invention, the system identifies a major event impacting the geo-location of the user. In some embodiments of the present invention, the major event is at least one selected from the group consisting of: a natural disaster; a political event; a military event; a police action; and an economic event. Note that this list is not an exhaustive list of possible events, and is meant only to provide some examples. In fact, any event type that can be determined as affecting a particular geo-location can be used with embodiments of the present invention.

In some embodiments of the present invention, the system determines the perceived emotion state of the user by querying a service with the major event to determine emotional states associated with the major event. For example, the system might query a database with the event "hurricane" and receive the emotional states of "depression, sadness, and fear." In another instance, the system might query a third-party service with the event "Olympics" and receive the emotional states of "excitement, happy, and determination."

In some embodiments of the present invention, the system determines a weather for the geo-location of the user. In some embodiments of the present invention, the system determines the perceived emotion state of the user by querying a service with the weather to determine emotional states associated with the weather. For example, the system might determine that it is snowing in the general vicinity of the user and determine emotional states that go along with snow.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources.

Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
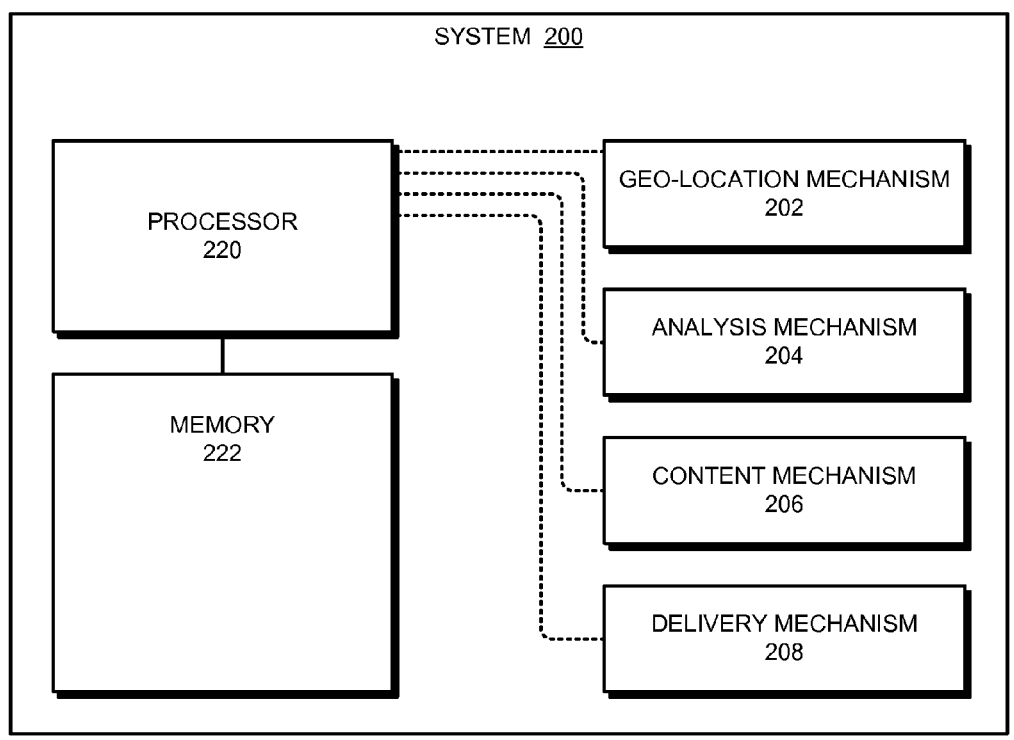
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include geo-location mechanism 202, analysis mechanism 204, content mechanism 206, delivery mechanism 208, processor 220, and memory 222.

Forming Content Based on a Perceived Emotional State

Figure 3:
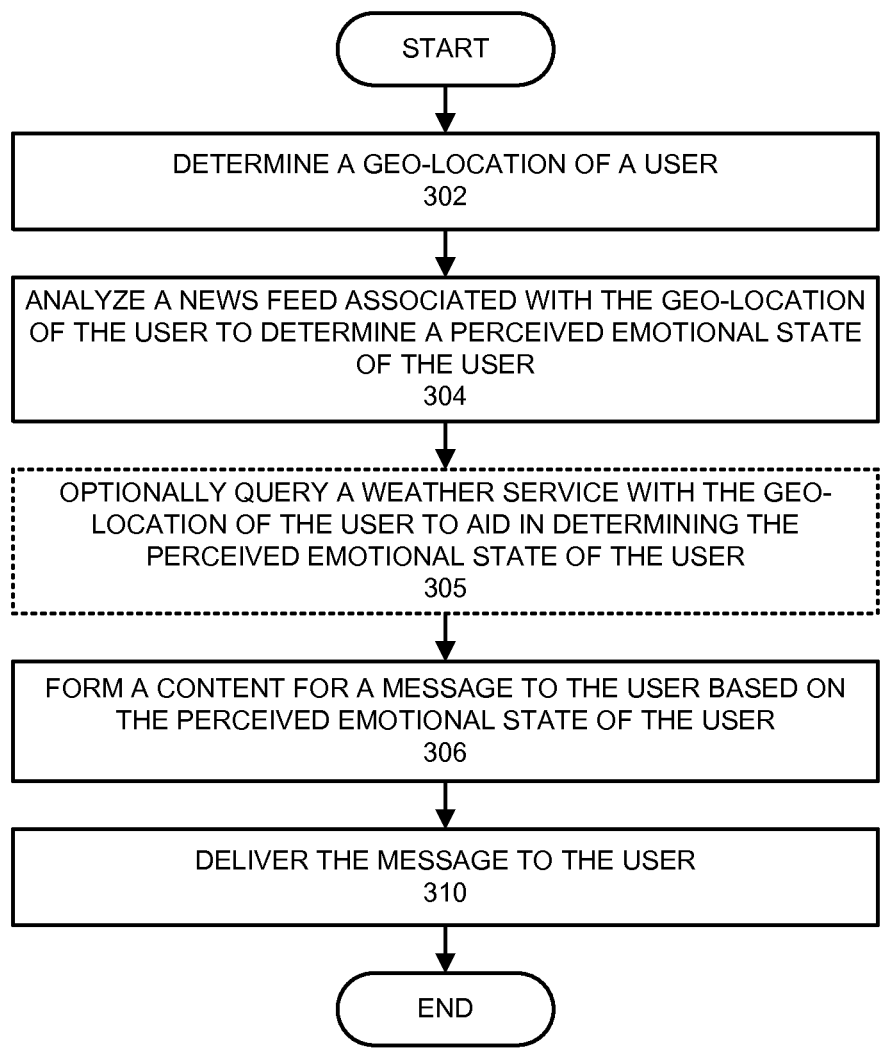
FIG. 3 presents a flow chart illustrating the process of forming content based on a perceived emotional state of a user in accordance with an embodiment of the present invention.

FIG. 3 presents a flow chart illustrating the process of forming content based on a perceived emotional state of a user in accordance with an embodiment of the present invention.

During operation, geo-location mechanism 202 determines a geo-location of a user 120 (operation 302). As described previously, there are different techniques for determining the geo-location of the user, and there are different location granularities, from a global level all of the way to an exact pinpoint location. Note that any means of geo-location and location granularity may be used with embodiments of the present invention.

Next, analysis mechanism 204 analyzes a news feed associated with the geo-location of user 120 to determine a perceived emotion state of user 120 (operation 304). As described previously, analyzing the news feed associated with the geo-location of user 120 to determine a perceived emotion state of user 120 may involve querying a service with events from the news feed to determine the perceived emotion state of user 120. Note that the Instant Application describes the "perceived emotion state" of the user because it is impossible for the system to determine the actual emotional state of the user without querying the user directly. Based on the current events in the news feed from user 120's geo-location, the system can determine a better-than-average likelihood that user 120 is experiencing a particular emotion state.

In some embodiments of the present invention, analysis mechanism 204 queries a weather service with the geo-location of user 120 to aid in determining the perceived emotion state of user 120 (operation 305). Note that while, in some embodiments, analysis mechanism 204 may obtain the weather for the geo-location from the news feed, in many instances if the weather is not out of the ordinary for a particular time period, there may be no mention of weather in the news feed. Thus, analysis mechanism 120 may query a weather service for the particular geo-location if weather is a required component in the particular embodiment.

Once a perceived emotion state has been determined for user 120, content mechanism 206 forms a content for a message to user 120 based on the perceived emotional state of user 120 (operation 306). Finally, delivery mechanism 208 delivers the message to user 120 (operation 308). Note that the technique for delivering the message to user 120 is beyond the scope of this invention. Embodiments of the present invention may utilize any delivery technique for delivering messages to user 120.

Messaging Framework

Note that the embodiments described herein may be implemented as part of an overarching messaging framework designed to leverage existing knowledge about user 120 and user 120's environment to create specific targeted messages to user 120 that are more likely to be perceived positively by user 120 than non-targeted messages. In addition to the above-described "Time Rules Engine" that tries to determine the emotional statue of user 120 based on current events associated with a geo-location of user 120, some embodiments may also include a "Data Rules Engine," as well as a "Finance Rules Engine."

The Data Rules Engine examines specific user data known to the system, such as usage statistics, response statistics to previous messages, etc. The Finance Rules Engine examines both user 120's finances, as well as current trends and laws within the finance community.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for dynamically forming the content of a message to a user based on a perceived emotion state of the user, the method comprising:
   determining, by computer, a geo-location of a user which includes determining a granularity of the geo-location;
   analyzing, by computer, a news feed associated with the geo-location of the user to determine a perceived emotion state of the user;
   analyzing, by computer, current financial laws for the geo-location of the user;
   forming, by computer, a content for a message to the user based on the perceived emotional state of the user, and the current financial laws for the geo-location of the user; and
   delivering, by computer, the message.

2. The computer-implemented method of claim 1, wherein determining the geo-location of the user comprises querying a service with an Internet Protocol (IP) address of the user.

3. The computer-implemented method of claim 1, wherein determining the geo-location of the user comprises retrieving an address associated with the user from a profile associated with the user.

4. The computer-implemented method of claim 1, wherein analyzing the news feed associated with the geo-location of the user involves identifying a major event impacting the geo-location of the user.

5. The computer-implemented method of claim 4, wherein the major event is at least one selected from the group consisting of:
   a natural disaster;
   a political event;
   a military event;
   a police action; and
   an economic event.

6. The computer-implemented method of claim 4, wherein determining the perceived emotion state of the user involves querying a service with the major event to determine emotional states associated with the major event.

7. A non-transitory computer-readable storage medium storing instructions that when executed by a computer cause the computer to perform a method for dynamically forming the content of a message to a user based on a perceived emotion state of the user, the method comprising:
   determining, by computer, a geo-location of a user which includes determining a granularity of the geo-location;
   analyzing, by computer, a news feed associated with the geo-location of the user to determine a perceived emotion state of the user;
   analyzing, by computer, current financial laws for the geo-location of the user;
   forming, by computer, a content for a message to the user based on the perceived emotional state of the user, and the current financial laws for the geo-location of the user; and
   delivering, by computer, the message.

8. The non-transitory computer-readable storage medium of claim 7, wherein determining the geo-location of the user comprises querying a service with an Internet Protocol (IP) address of the user.

9. The non-transitory computer-readable storage medium of claim 7, wherein determining the geo-location of the user comprises retrieving an address associated with the user from a profile associated with the user.

10. The non-transitory computer-readable storage medium of claim 7, wherein analyzing the news feed associated with the geo-location of the user involves identifying a major event impacting the geo-location of the user.

11. The non-transitory computer-readable storage medium of claim 10, wherein the major event is at least one selected from the group consisting of:
   a natural disaster;
   a political event;
   a military event;
   a police action; and
   an economic event.

12. The non-transitory computer-readable storage medium of claim 10, wherein determining the perceived emotion state of the user involves querying a service with the major event to determine emotional states associated with the major event.

13. An apparatus configured to dynamically form the content of a message to a user based on a perceived emotion state of the user, comprising:
- a geo-location mechanism configured to determine a geo-location of a user including a granularity of the geo-location;
- an analysis mechanism configured to analyze a news feed associated with the geo-location of the user to determine a perceived emotion state of the user;
- wherein the analysis mechanism is further configured to analyze current financial laws for the geo-location of the user;
- a content mechanism configured to form a content for a message to the user based on the perceived emotional state of the user, and the current financial laws for the geo-location of the user; and
- a delivery mechanism configured to deliver the message.

14. The apparatus of claim 13, wherein the analysis mechanism is further configured to identify a major event impacting the geo-location of the user.

15. The apparatus of claim 14, wherein the major event is at least one selected from the group consisting of:
- a natural disaster;
- a political event;
- a military event;
- a police action; and
- an economic event.

16. The apparatus of claim 14, wherein the analysis mechanism is further configured to query a service with the major event to determine emotional states associated with the major event.

* * * * *